US012345976B2

(12) United States Patent
    Sakamoto

(10) Patent No.: US 12,345,976 B2
(45) Date of Patent: Jul. 1, 2025

(54) LIQUID CRYSTAL DEVICE HAVING PLURAL SUBSTRATES AND ELECTRONIC APPARATUS

(71) Applicant: SEIKO EPSON CORPORATION, Tokyo (JP)

(72) Inventor: Kazunari Sakamoto, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/522,915

(22) Filed: Nov. 29, 2023

(65) Prior Publication Data

US 2024/0176177 A1    May 30, 2024

(30) Foreign Application Priority Data

Nov. 30, 2022   (JP) ................. 2022-191195

(51) Int. Cl.
   *G02F 1/1333*  (2006.01)
   *G02F 1/1345*  (2006.01)

(52) U.S. Cl.
   CPC .. *G02F 1/133368* (2021.01); *G02F 1/133331* (2021.01); *G02F 1/133382* (2013.01); *G02F 1/13452* (2013.01)

(58) Field of Classification Search
   CPC ......... G02F 1/133382; G02F 1/133331; G02F 1/133368; G02F 1/13452
   See application file for complete search history.

(56) References Cited

U.S. PATENT DOCUMENTS

| 5,886,763 A | * | 3/1999 | Wolkowicz | ......... G02F 1/13452 349/161 |
| 2004/0036834 A1 | | 2/2004 | Ohnishi et al. | |
| 2008/0309865 A1 | * | 12/2008 | Sugita | ............... G02F 1/133382 349/149 |
| 2022/0066258 A1 | * | 3/2022 | Cho | ..................... G02F 1/13338 |

FOREIGN PATENT DOCUMENTS

| JP | H09-096824 A | 4/1997 |
| JP | 2004-139018 A | 5/2004 |
| JP | 2007-199339 A | 8/2007 |

* cited by examiner

*Primary Examiner* — Paisley L Wilson
(74) *Attorney, Agent, or Firm* — Oliff PLC

(57) ABSTRACT

A liquid crystal device includes an element substrate, a terminal provided at the element substrate, an FPC substrate electrically coupled to the terminal, a counter substrate disposed overlapping with the element substrate, a heater including a coupling portion provided at the counter substrate, an FPC substrate electrically coupled to the coupling portion, and a liquid crystal sandwiched between the element substrate and the counter substrate, wherein the terminal is provided outside one side of a rectangular region in which the element substrate and the counter substrate overlap with each other in plan view, and the coupling portion is provided outside sides other than the one side of the rectangular region.

5 Claims, 12 Drawing Sheets

LIQUID CRYSTAL DEVICE HAVING PLURAL SUBSTRATES AND ELECTRONIC APPARATUS

The present application is based on, and claims priority from JP Application Serial Number 2022-191195, filed Nov. 30, 2022, the disclosure of which is hereby incorporated by reference herein in its entirety.

BACKGROUND

1. Technical Field

The present disclosure relates to a liquid crystal device and an electronic apparatus.

2. Related Art

In a liquid crystal panel, when a temperature of the liquid crystal is low, an optical response is reduced. Thus, a liquid crystal panel is known in which a heater is incorporated and the temperature of the liquid crystal is increased by heat generated by the heater to improve the optical response (see, for example, JP-A-2007-199339). Specifically, in the liquid crystal panel described in JP-A-2007-199339, the heater is disposed overlapping with a drive region in a planar manner.

However, in the technique described in JP-A-2007-199339, an FPC substrate for supplying a control signal to the drive region is configured to supply electric power to the heater. Since a current greater than a control signal flows through the heater, there is a problem that noise is likely to be superimposed on the control signal. In view of such circumstances, an aspect of the present disclosure is to provide a technique for suppressing superimposition of noise on the control signal in a configuration in which a voltage is applied to the heater to cause the current to flow.

SUMMARY

In order to solve the above problems, a liquid crystal device according to one aspect of the present disclosure includes a first substrate, a first coupling portion provided at the first substrate, a first flexible substrate electrically coupled to the first coupling portion, a second substrate disposed overlapping with the first substrate, a second coupling portion provided at the second substrate, a heating member provided at the second substrate, a second flexible substrate electrically coupled to the heating member via the second coupling portion, and a liquid crystal layer sandwiched between the first substrate and the second substrate, wherein the first coupling portion is provided outside one side of a rectangular region overlapping with the first substrate and the second substrate in plan view, and the second coupling portion is provided outside a side other than the one side of the rectangular region.

DESCRIPTION OF EMBODIMENTS

An electro-optical device according to exemplary embodiments will be described below with reference to the accompanying drawings. Note that in each of the drawings, dimensions and scale of each part are made different from actual ones as appropriate. Further, embodiments described below are suitable specific examples, and various technically preferable limitations are applied, but the scope of the disclosure is not limited to these embodiments unless they are specifically described in the following description as limiting the disclosure.

First Exemplary Embodiment

Figure 1:
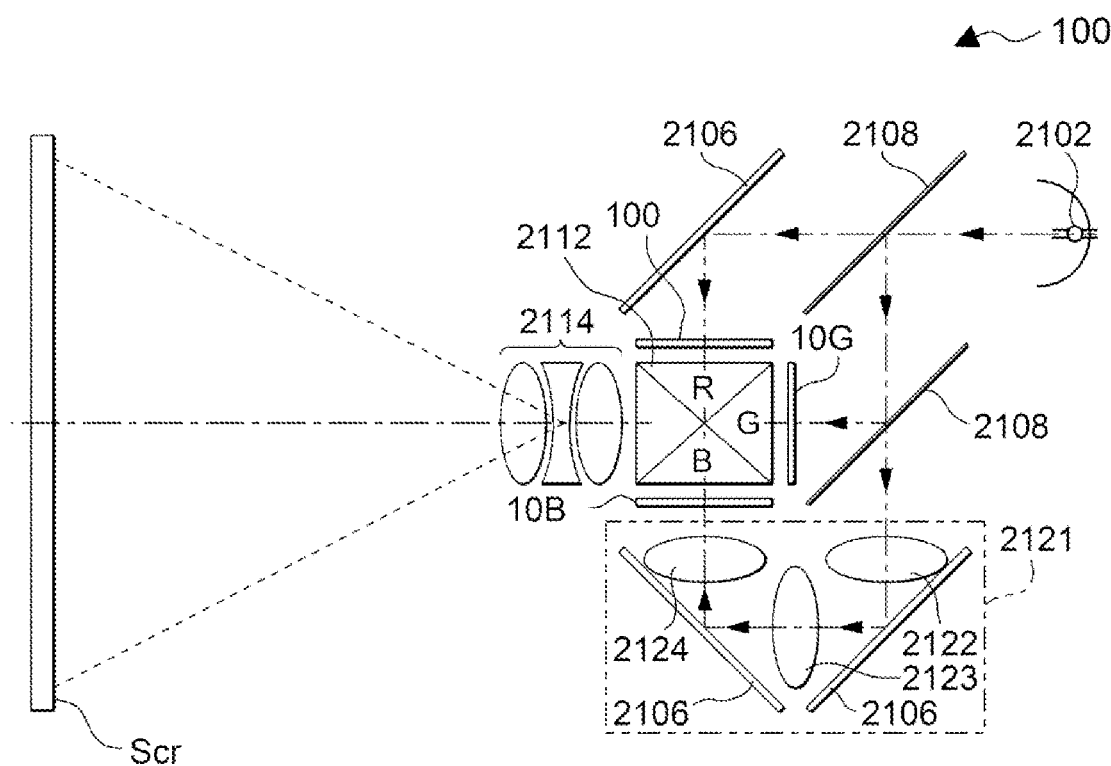
FIG. 1 is a diagram illustrating an optical configuration of a projection-type display apparatus to which an electro-optical device according to a first exemplary embodiment is applied.

FIG. 1 is a diagram illustrating an optical configuration of a projection-type display apparatus 100 to which an electro-optical device according to a first exemplary embodiment is applied. As illustrated in the drawing, the projection-type display apparatus 100 includes electro-optical devices 10R, 10G, and 10B. Further, the projection-type display apparatus 100 is provided with a lamp unit 2102 including a white light source such as a halogen lamp. Projection light emitted from the lamp unit 2102 is separated into three primary colors of red (R), green (G), and blue (B) by three mirrors 2106 and two dichroic mirrors 2108. Of the light of the primary colors, light of R is incident on the electro-optical device 10R, light of G is incident on the electro-optical device 10G, and light of B is incident on the electro-optical device 10B, respectively.

Note that since an optical path of B is longer than each of optical paths of R and G, it is necessary to prevent a loss in the B optical path. Thus, a relay lens system 2121 including an incidence lens 2122, a relay lens 2123, and an emission lens 2124 is provided at the B optical path.

In the exemplary embodiment, the electro-optical device 10R is a liquid-crystal panel having a plurality of pixel circuits. Each of the plurality of pixel circuits includes a liquid crystal element. The liquid crystal element of the electro-optical device 10R is driven based on a data signal corresponding to R as will be described below, and has a transmittance corresponding to an effective value of a voltage of the data signal. Therefore, in the electro-optical device 10R, the transmittance of the liquid crystal element is individually controlled, so that a transmitted image of R is generated. Similarly, in the electro-optical device 10G, a transmitted image of G is generated based on a data signal corresponding to G, and in the electro-optical device 10B, a transmitted image of B is generated based on a data signal corresponding to B.

The transmitted images of the respective colors generated by the electro-optical devices 10R, 10G, and 10B are incident on a dichroic prism 2112 from three directions. At the dichroic prism 2112, the light of R and the light of B are refracted at 90 degrees, whereas the light of G travels in a straight line. Thus, the dichroic prism 2112 combines the images of the respective colors. The combined image formed by the dichroic prism 2112 is incident on a projection lens 2114.

The projection lens 2114 enlarges and projects the combined image formed by the dichroic prism 2112 onto a screen Scr.

The transmitted images formed by the electro-optical devices 10R and 10B are emitted after being reflected by the dichroic prism 2112, whereas the transmitted image formed by the electro-optical device 10G travels straight and is emitted. Therefore, the transmitted images by the electro-optical devices 10R and 10B are in a relationship of being laterally inverted with respect to the transmitted image of the electro-optical device 10G.

Figure 2:
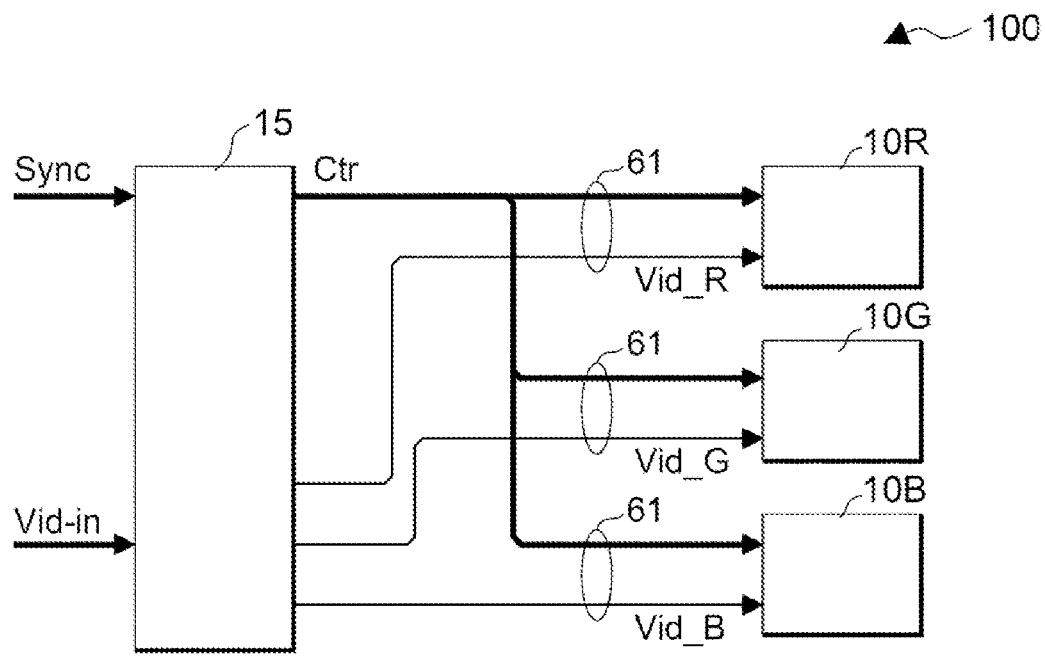
FIG. 2 is a block diagram illustrating an electrical configuration of a drive system in the projection-type display apparatus.

FIG. 2 is a block diagram illustrating a configuration for controlling display in the electrical configuration of the projection-type display apparatus 100. As illustrated in the drawing, the projection-type display apparatus 100 includes the above-described electro-optical devices 10R, 10G, and 10B and a display control circuit 15.

Video data Vid-in is supplied to the display control circuit 15 in synchronization with a synchronization signal Sync from a higher-level device such as a host device (not illustrated). The video data Vid-in designates a gray scale level of a pixel in an image to be displayed for each of RGB, for example, by 8 bits.

In the projection-type display apparatus 100, the color image projected on the screen Scr is expressed by combining the transmitted images of the electro-optical devices 10R, 10G, and 10B as described above. Therefore, a pixel which is a minimum unit of a color image can be divided into a red sub-pixel by the electro-optical device 10R, a green sub-pixel by the electro-optical device 10G, and a blue sub-pixel by the electro-optical device 10B. However, regarding the sub-pixels in the electro-optical devices 10R, 10G, and 10B, when it is not necessary to specify the color, or when only brightness is a problem, etc., it is not necessary to describe the sub-pixels. Therefore, in this description, a display unit in the electro-optical devices 10R, 10G, and 10B is simply referred to as a pixel.

The synchronization signal Sync includes a vertical synchronization signal that instructs a start of vertical scanning of the video data Vid-in, a horizontal synchronization signal that instructs a start of horizontal scanning, and a clock signal that indicates a timing for one video pixel in the video data Vid-in.

The display control circuit 15 divides the video data Vid-in from the higher-level device into RGB components, converts the RGB components into analog voltage data signals, and supplies the analog voltage data signals to the electro-optical devices 10R, 10G, and 10B. In detail, the display control circuit 15 converts the R component of the video data Vid-in into an analog signal, and supplies the analog signal as a data signal Vid-R to the electro-optical device 10R via a flexible printed circuits (FPC) substrate 61. Similarly, the display control circuit 15 converts the G component of the video data Vid-in into an analog signal and supplies the analog signal as a data signal Vid-G to the electro-optical device 10G via the FPC substrate 61, and converts the B component into an analog signal and supplies the analog signal as a data signal Vid-B to the electro-optical device 10B via the FPC substrate 61.

The display control circuit 15 sequentially supplies the data signals Vid_R, Vid_G, and Vid_B via the FPC substrate 61 in synchronization with a control signal Ctr for controlling the driving of the electro-optical devices 10R, 10G, and 10B.

Next, the electro-optical devices 10R, 10G, and 10B will be described. The electro-optical devices 10R, 10G, and 10B are different only in the color of incident light, that is, the wavelength, and otherwise have the same structure. Therefore, the electro-optical devices 10R, 10G, and 10B are denoted by a reference numeral 10 and will be generally described without specifying the color.

Figure 3:
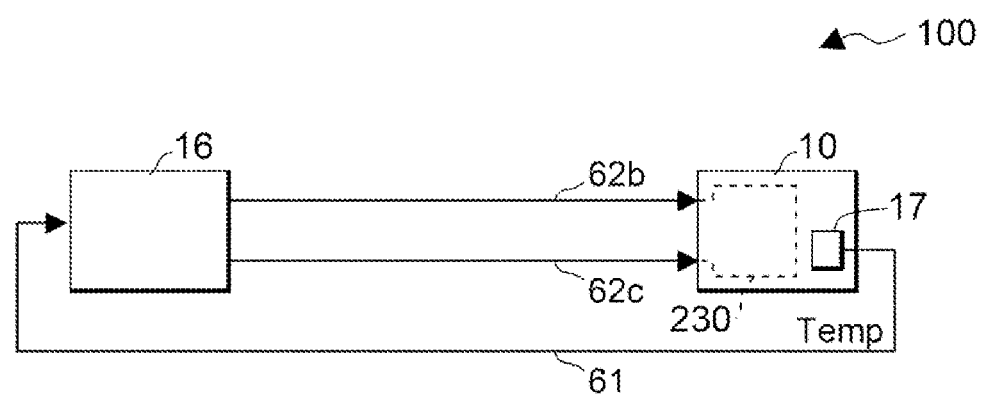
FIG. 3 is a diagram illustrating a configuration for controlling a heater in the projection-type display apparatus.

FIG. 3 is a block diagram illustrating a configuration for controlling heating of the electro-optical device 10. The electro-optical device 10 is provided with a heater 230 and a temperature sensor 17. The heater 230 is an example of a heating member. The temperature control circuit 16 applies a voltage to the heater 230 via FPC substrates 62a and 62b.

The temperature sensor 17 detects a temperature of the electro-optical device 10 and outputs information Temp indicating the temperature as a detection value. The information Temp is supplied to the temperature control circuit 16 via an FPC substrate different from the FPC substrates 62a and 62b, for example, an FPC substrate 61.

The temperature control circuit 16 controls the voltage applied to the heater 230 so that the temperature indicated by the information Temp becomes a target temperature. Specifically, if the temperature indicated by the information Temp is lower than the target temperature, the temperature control circuit 16 increases the voltage applied to the heater 230.

The target temperature is a temperature suitable for use of the electro-optical device 10, and is set in advance in the temperature control circuit 16. Further, the fluctuation of the voltage applied to the heater 230 acts as a noise source. Thus, the temperature control circuit 16 controls the voltage applied to the heater 230 at a constant voltage, and switches the constant voltage in a stepwise manner, for example, every minute in accordance with the temperature indicated by the information Temp.

Figure 4:
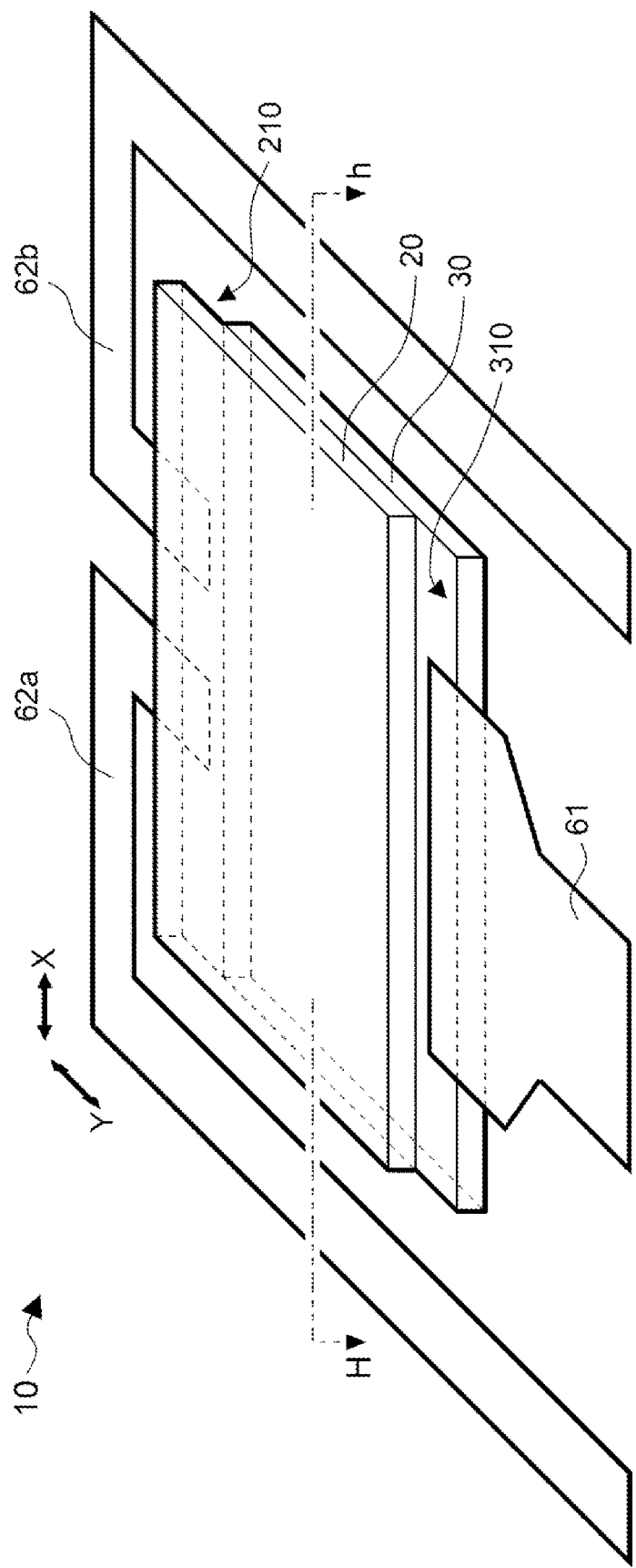
FIG. 4 is a perspective view illustrating the electro-optical device.
Figure 5:
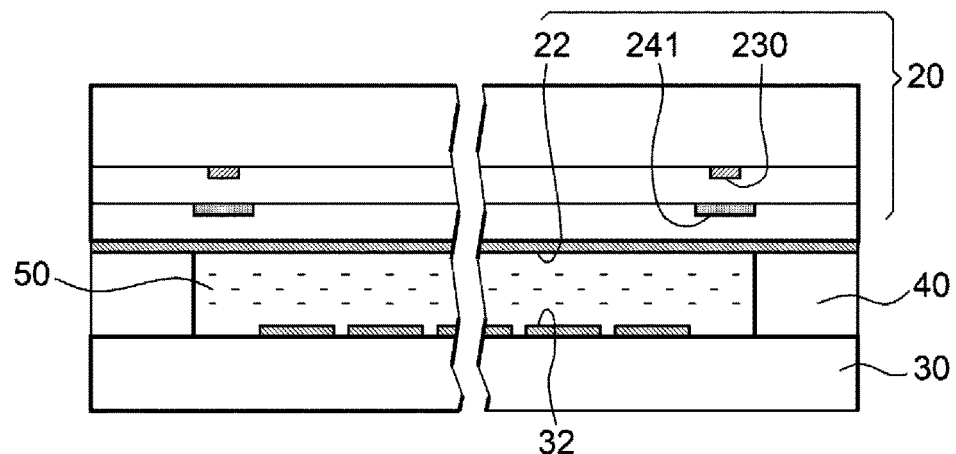
FIG. 5 is a cross-sectional view illustrating a structure of the electro-optical device.

FIG. 4 is a perspective view illustrating an appearance of the electro-optical device 10, and FIG. 5 is a cross-sectional view taken along a line H-h in FIG. 4. In addition, the line H-h is a virtual line which cuts the electro-optical device 10 along the X-axis to include a region where the counter substrate 20 and the element substrate 30 overlap with each other.

As illustrated in FIG. 5, in the electro-optical device 10, the counter substrate 20 at which a common electrode 22 is provided and the element substrate 30 at which a pixel electrode 32 is provided are bonded to each other by a sealing material 40, such that the electrode forming surfaces face each other while maintaining a constant gap, and a liquid crystal 50 is sealed in the gap.

The element substrate 30 is an example of a first substrate, the counter substrate 20 is an example of a second substrate, and the liquid crystal 50 is an example of an electro-optical layer.

As illustrated in FIG. 4, in the exemplary embodiment, the counter substrate 20 and the element substrate 30 have the same length of sides along the X-axis, but are bonded to each other to be shifted from each other along the Y-axis. Thus, the counter substrate 20 is provided with a protruding portion 210 which protrudes from the element substrate 30, and the element substrate 30 is provided with a protruding portion 310 which protrudes from the counter substrate 20.

Note that the Y-axis does not define the orientation in the direction in which the data line extends in the electro-optical device 10, and runs along a long side of a display region described below. The X-axis, which will be described below, intersects the Y-axis in plan view, and does not define the orientation in the direction in which the scanning line extends in the electro-optical device 10. The X-axis runs along a short side of the display region.

In addition, in the present description, the plan view means that the substrate is viewed from a direction perpendicular to the substrate surface, that is, a thickness direction of the substrate. The cross-sectional view means that the substrate is viewed by being cut in the direction perpendicular to the substrate surface.

As each of the counter substrate 20 and the element substrate 30, a base material having optical transparency and insulation properties, such as glass or quartz, is used. As will be described below, a plurality of terminals are provided at the protruding portion 310, and are respectively coupled to one ends of a plurality of pieces of wiring provided in the flexible printed circuits (FPC) substrate 61. The FPC substrate 61 is an example of a first flexible substrate.

The other end of the plurality of terminals provided at the FPC substrate 61 is coupled to the display control circuit 15 and the temperature control circuit 16. Accordingly, the data signal and the control signal described above are supplied from the display control circuit 15 to the electro-optical device 10, and the information Temp indicating the temperature is supplied from the electro-optical device 10 to the temperature control circuit 16.

Two terminals coupled to the heater 230 are provided at the protruding portion 210, and one ends of the wiring provided at the FPC substrates 62a and 62b are coupled thereto, respectively. The other ends of the wiring provided at the FPC substrates 62a and 62b are coupled to the temperature control circuit 16. Accordingly, a voltage controlled by the temperature control circuit 16 is applied to the heater 230 via the FPC substrates 62a and 62b. The FPC substrates 62a and 62b are an example of a second flexible substrate.

Each of the FPC substrates 62a and 62b has a configuration in which bending of 90 degrees is repeated twice. This is because the temperature control circuit 16 is provided on the same side as the display control circuit 15 with respect to the electro-optical device 10.

In the electro-optical device 10, light from the lamp unit 2102 is incident on the counter substrate 20 and is emitted from the element substrate 30.

Figure 6:
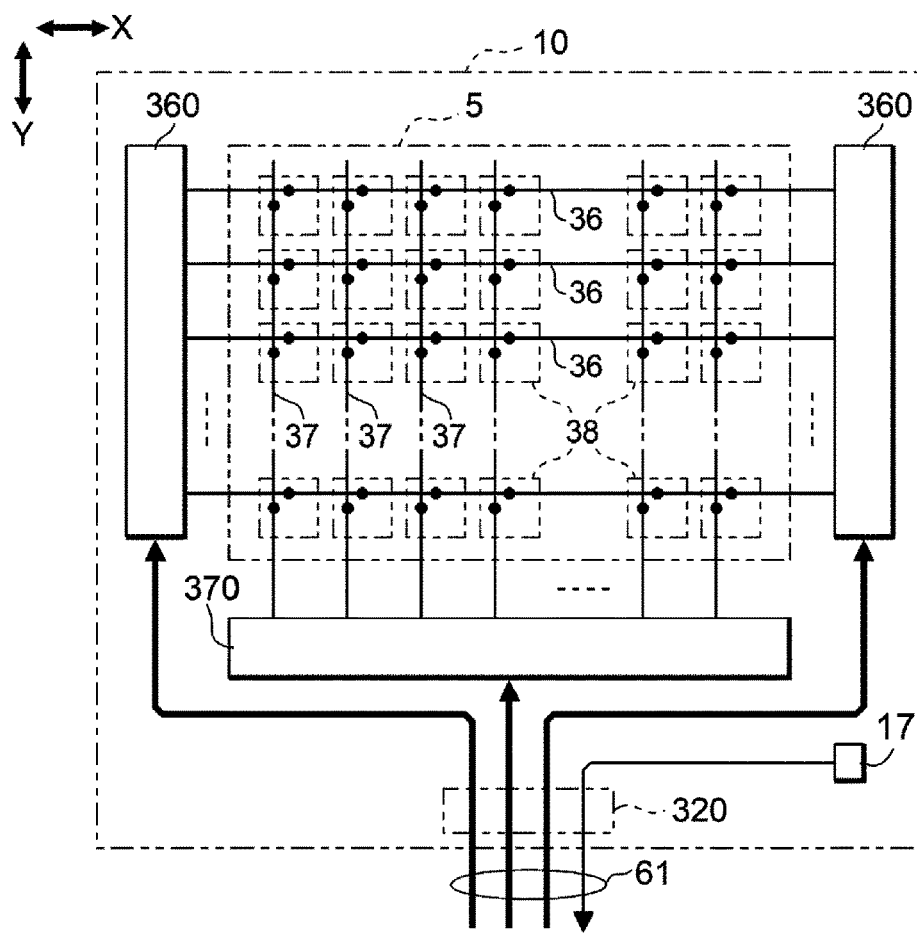
FIG. 6 is a block diagram illustrating an electrical configuration of the electro-optical device.

Here, for convenience, an electrical configuration of the electro-optical device 10 will be described. FIG. 6 is a block diagram illustrating an electrical configuration of the electro-optical device 10.

In the element substrate 30 of the electro-optical device 10, a scanning line drive circuit 360 and a data line drive circuit 370 are provided on the periphery of the display region 5.

In detail, a plurality of scanning lines 36 are provided extending along the X-axis on the element substrate 30. A plurality of data lines 37 extend along the Y-axis and are provided to be electrically insulated from the scanning lines 36. Pixel circuits 38 are provided in a matrix corresponding to the intersections of the plurality of scanning lines 36 and the plurality of data lines 37.

When the number of scanning lines 36 is m and the number of data lines 37 is n, the pixel circuits 38 are arranged in a matrix of m rows and n columns. m and n are each an integer of 2 or greater. In the scanning lines 36 and the pixel circuits 38, in order to distinguish the rows of the matrix, the rows may be referred to as first, second, third, (m−1)-th, and m-th rows in order from the top in the drawing. Similarly, in the data line 37 and the pixel circuits 38, in order to distinguish the columns of the matrix, the columns may be referred to as first, second, third, . . . , (n−1)-th, and n-th columns in order from the top in the drawing.

The scanning line drive circuit 360 selects the scanning lines 36 one by one in the order of, for example, the first, second, third, . . . , and m-th rows according to the control signal Ctr from the display control circuit 15, and sets the scanning signal to the selected scanning line 36 to the H level. Note that the scan line driver circuit 360 sets scan signals to the scan lines 36 other than the selected scan line 36 to the L level.

The data line drive circuit 370 latches the data signal supplied from the display control circuit 15 for one row, and outputs the data signal to the pixel circuit 38 located on the scanning line 36 through the data line 37 in a period during which the scanning signal to the scanning line 36 is at the H level.

A plurality of terminals 320 are provided at the protruding portion 310 along the X-axis. The plurality of terminals 320 are terminals for supplying the control signal Ctr to the scanning-line drive circuit 360, a terminal for supplying a data signal, etc. to the data line drive circuit 370, and terminals for supplying information Temp from the temperature sensor 17 to the temperature control circuit 16. The plurality of terminals 320 are an example of a first coupling portion.

Figure 7:
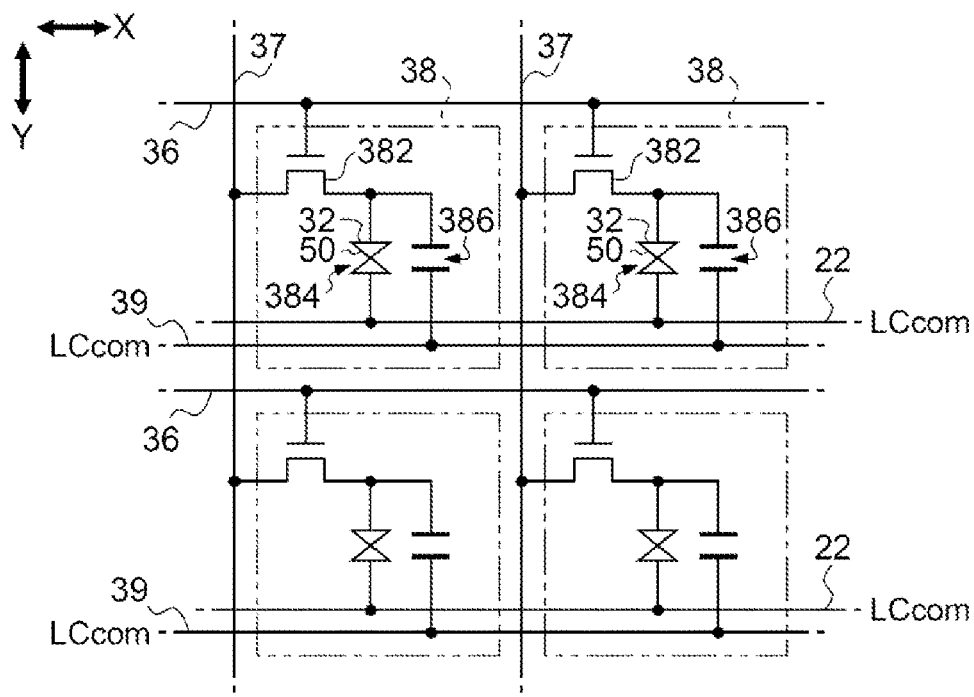
FIG. 7 is a diagram illustrating a configuration of a pixel circuit in the electro-optical device.

FIG. 7 is a diagram illustrating an equivalent circuit of the pixel circuits 38. Note that FIG. 7 illustrates an equivalent circuit of a total of four pixel circuits 38, two in the vertical direction and two in the horizontal direction, corresponding to the intersections of two adjacent scanning lines 36 and two adjacent data lines 37. The pixel circuits 38 have the same circuit configuration.

The pixel circuit 38 includes a transistor 382, a liquid crystal element 384, and a storage capacitor 386. The transistor 382 is, for example, an n-channel thin film transistor. In the pixel circuit 38, the gate electrode of the transistor 382 is electrically coupled to the scanning line 36. In addition, a source region of the transistor 382 is electrically coupled to the data line 37, and a drain region thereof is electrically coupled to the pixel electrode 32 and one end of the storage capacitor 386.

In the transistor 382, when the direction in which the current flows is reversed, the source region and the drain region are switched. However, in this description, a region electrically coupled to the data line 37 is referred to as a source region, and a region electrically coupled to the pixel electrode 32 is referred to as a drain region.

In addition, in the present description, "electrically coupled" or simply "coupled" means direct or indirect coupling or binding between two or more elements, and for example, includes a case where two or more elements are not directly coupled to each other in an element substrate, but different wirings are coupled to each other through a contact hole.

The common electrode 22 is provided in common to all the pixels to face the pixel electrode 32. A constant voltage LCcom is applied to the common electrode 22 with the passage of time. As described above, the liquid crystal 50 is sandwiched between the pixel electrode 32 and the common electrode 22. Therefore, the liquid crystal element 384, in which the liquid crystal 50 is sandwiched between the pixel electrode 32 and the common electrode 22, is configured for each pixel circuit 38.

The storage capacitor 386 is provided electrically in parallel with the liquid crystal element 384. One end of the storage capacitor 386 is electrically coupled to the pixel electrode 32, and the other end is electrically coupled to a capacitor line 39. A voltage that is constant over time, for example, the same voltage LCcom as the voltage applied to the common electrode 22, is applied to the capacitor line 39.

In the scanning line 36 in which the scanning signal is at the H level, the transistor 382 of the pixel circuit 38 provided corresponding to the scanning line 36 is turned on. When the transistor 382 is turned on, the data line 37 and the pixel electrode 32 are electrically coupled to each other, and thus the data signal supplied to the data line 37 reaches the pixel electrode 32 and one end of the storage capacitor 386 via the transistor 382 that has been turned on. When the scanning line 36 is at the L level, the transistor 382 is turned off, but the voltage of the data signal that has reached the pixel electrode 32 is held by the liquid crystal element 384 and the storage capacitor 386.

As is well known, in the liquid crystal element 384, the alignment of liquid crystal molecules changes in accordance with an electric field generated by the pixel electrode 32 and the common electrode 22. Therefore, the liquid crystal element 384 has a transmittance corresponding to the effective value of the applied voltage.

Note that in the case where the liquid crystal element 384 is in a normally black mode, the transmittance increases as the voltage applied to the liquid crystal element 384 increases.

The operation of supplying the data signal to the pixel electrode 32 of the liquid crystal element 384 is performed in the order of the first, second, third, . . . and m-th rows in one vertical scanning period. Accordingly, a voltage corresponding to the data signal is held in each of the liquid crystal elements 384 of the pixel circuits 38 arranged in m rows and n columns, and each of the liquid crystal elements 384 has a target transmittance, and then a transmitted image of a corresponding color is generated by the liquid crystal elements 384 arranged in m rows and n columns.

In this way, the transmitted image is generated for each of RGB, and the color image obtained by combining RGB is projected onto the screen Scr.

In the electro-optical device 10, a region where a transmitted image is generated is a region where the pixel electrodes 32 and the common electrodes 22 arranged in a matrix overlap with each other in plan view. Therefore, the display region 5 is a region where the pixel electrodes 32 and the common electrodes 22 arranged in a matrix overlap with each other in plan view.

The projection-type display apparatus 100 may be used not only indoors but also outdoors. The optical response of the liquid crystal element 384, specifically, a change characteristic of the transmittance with respect to a change in voltage applied to the liquid crystal element 384, decreases as the temperature decreases. Thus, in the present exemplary embodiment, the heater 230 is provided to heat the liquid crystal element 384, in particular, the liquid crystal 50, in order to prevent the optical response from being lowered even when the outside air temperature is lowered.

When the liquid crystal 50 of the display region 5 is non-uniformly heated by the heater 230, the optical response is biased in the display region 5, and particularly, the display quality of a moving image is decreased. Therefore, in the present exemplary embodiment, a configuration is adopted in which the heater 230 is provided at a position which is the outer peripheral edge of the display region 5 in plan view in the counter substrate 20 and overlaps with a picture frame (parting).

Figure 8:
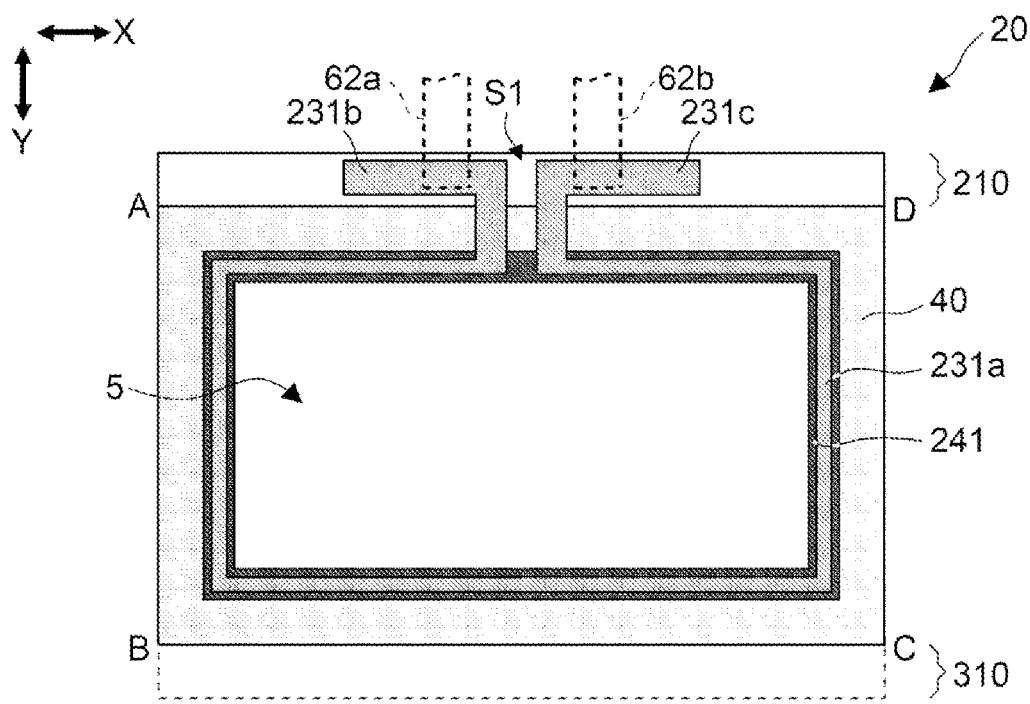
FIG. 8 is a plan view illustrating a counter substrate of the electro-optical device.
Figure 9:
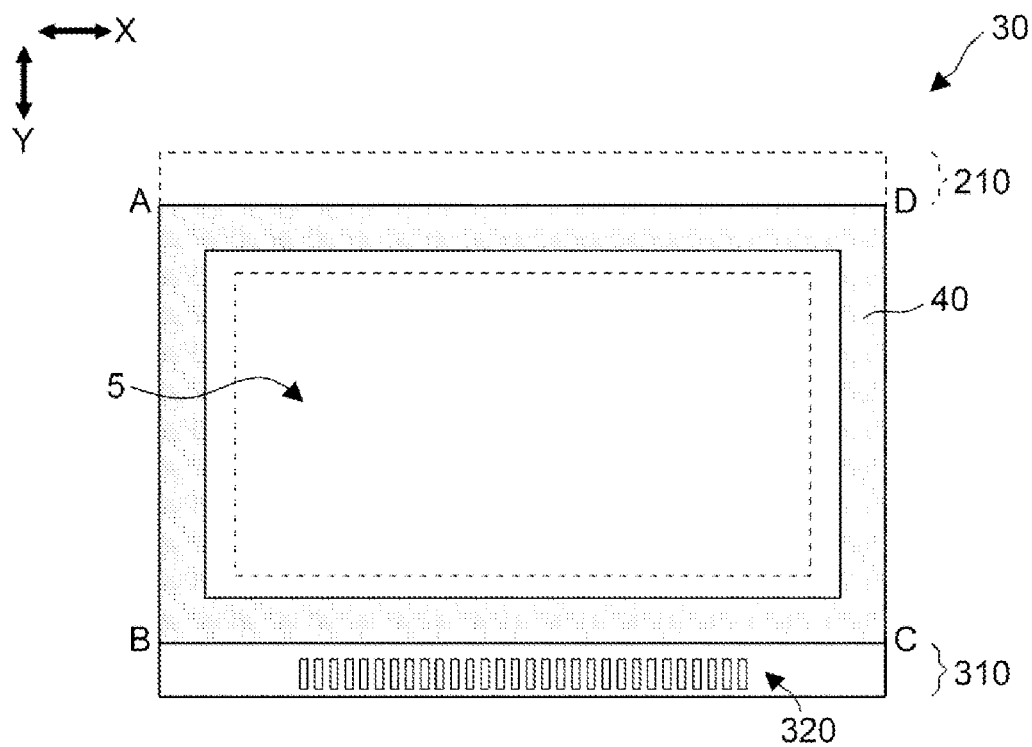
FIG. 9 is a plan view illustrating an element substrate of the electro-optical device.

FIGS. 8 and 9 are plan views of the electro-optical device 10, in which FIG. 8 is a plan view mainly illustrating the counter substrate 20, and FIG. 9 is a plan view illustrating the element substrate 30. In addition, FIG. 8 is a diagram in which the counter substrate 20 of the electro-optical device 10 is separated from the element substrate 30 and is viewed from a direction in which light from the lamp unit 2102 is incident, for the purpose of description. In this manner, the element substrate 30 is separated from the electro-optical device 10, and the counter substrate 20 provided with the heater 230 is viewed from the direction in which light is incident, which is the same as in FIGS. 10, 11, 15, and 16 described below.

In addition, FIG. 9 is a diagram illustrating the element substrate 30 of the electro-optical device 10 when the counter substrate 20 is separated and viewed from the incident direction of light for the purpose of description.

The sealing material 40 is provided in a frame shape along the inside of the periphery of a rectangular region in which the counter substrate 20 and the element substrate 30 overlap with each other in plan view.

In FIGS. 8 and 9, four corners of the rectangular region in which the counter substrate 20 and the element substrate 30 overlap with each other in plan view are denoted by A, B, C, and D, respectively. In other words, it is assumed that the outer shape of the rectangular region is formed by four sides AB, BC, CD, and DA. In the counter substrate 20, as indicated by a solid line in FIG. 8 (a broken line in FIG. 9), the protruding portion 210 is provided outside the side DA. In the element substrate 30, as indicated by a broken line in FIG. 8 (a broken line in FIG. 9), the protruding portion 210 is provided outside the side BC.

The light blocking film 241 is provided in a frame shape inside the sealing material 40 in plan view. The light blocking film 241 is a picture frame defining the outer peripheral edge of the display region 5, and has a light blocking property. The scanning line drive circuits 360 are provided to be hidden in two regions along the Y-axis in the frame-shaped light blocking film 241. In addition, the data line drive circuit 370 is provided to be hidden in the region along the side BA of the two regions along the X-axis in the light blocking film 241.

Since the scanning line drive circuits 360 and the data line drive circuit 370 are hidden by the light blocking film 241, it is possible to prevent light which is incident from the counter substrate 20 toward the element substrate 30 from entering a transistor which configures the scanning line drive circuit 360 and the data line drive circuit 370. This prevents the scanning line drive circuit 360 and the data line drive circuit 370 from malfunctioning due to light leakage.

In addition, when an ultraviolet curable resin is used as the sealing material 40, the light blocking film 241 is provided without overlapping with the sealing material 40 in plan view. This is because, when the counter substrate 20 and the element substrate 30 are bonded to each other after the application of the sealing material 40 and ultraviolet rays are irradiated in a direction from the counter substrate 20 toward the element substrate 30 in order to cure the sealing material 40, the curing of the sealing material 40 is not prevented by the light blocking of the light blocking film 241.

In the heater 230, as illustrated in FIG. 8, a frame portion 231*a* which is located between the display region 5 and the sealing material 40 in plan view and overlaps with the light blocking film 241, and coupling portions 231*b* and 231*c* for applying a voltage to the frame portion 231*a* are integrated.

In detail, the frame portion 231*a* is provided with a slit S1 and is electrically divided into one end and the other end. The one end is extended to the protruding portion 210 to form the coupling portion 231*b*, and the other end is extended to the protruding portion 210 to form the coupling portion 231*c*. In other words, a portion of the heater 230 excluding the coupling portion 231*b* and the coupling portion 231*c* is the frame portion 231*a*. The frame portion 231*a* is provided overlapping with the light blocking film 241 in plan view and to be narrower than the light blocking film 241.

The widths of the frame portion 231*a* and the light blocking film 241 refer to dimensions in a direction orthogonal to the extending direction of the frame portion 231*a* and the light blocking film 241 in plan view. The coupling portions 231*b* and 231*c* are an example of a second coupling portion.

The heater 230 is a wiring film obtained by patterning a conductive layer made of, for example, aluminum (Al), titanium nitride (TiN), tungsten silicide (WSi), etc. The heater 230 has one end and the other end electrically, and generates heat when a current flows from one of the one end and the other end to the other.

In this description, the term "layer" refers to a conductive layer and a wiring layer that are not patterned, and the term "film" refers to a conductive layer and a wiring layer that are patterned.

As illustrated in FIG. 9, a plurality of terminals 320 are provided along the X-axis in the protruding portion 310 of the element substrate 30.

Figure 10:
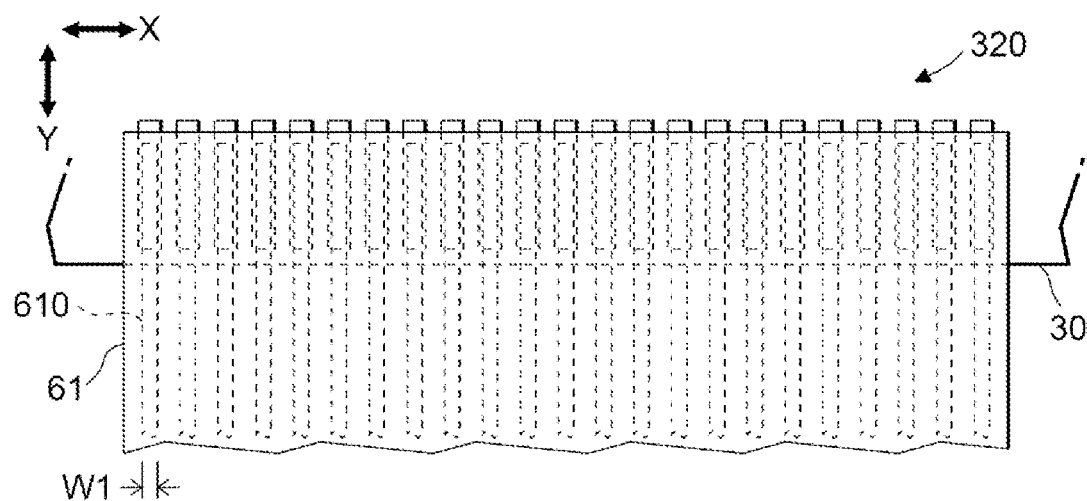
FIG. 10 is a view illustrating a coupling state between an FPC substrate and the element substrate.

FIG. 10 is a plan view illustrating a coupling state between the plurality of terminals 320 and the FPC substrate 61 in the protruding portion 310. As illustrated in FIG. 10, the plurality of terminals 320 are electrically coupled to a plurality of pieces of wiring 610 provided at the FPC substrate 61, for example, in a one-to-one manner. For this electrical coupling, an anisotropic adhesive or an isotropic conductive film is used. The plurality of pieces of wiring 610 in the FPC substrate 61 also serve as coupling terminals to the plurality of terminals 320, have widths W1, and are arranged at equal intervals.

According to the first exemplary embodiment, the light blocking film 241 which shields the scanning line drive circuit 360 and the data line drive circuit 370 from light is provided in a frame shape outside the display region 5 and inside the sealing material 40 in plan view. Thus, even when an ultraviolet curable resin is used as the sealing material 40, since the light blocking film 241 does not overlap with the sealing material 40 in plan view, the light blocking film 241 does not hinder the curing of the sealing material 40 due to the irradiation of ultraviolet rays. Therefore, it is possible to suppress the occurrence of a bonding failure between the counter substrate 20 and the element substrate 30.

The frame portion 231*a* of the heater 230 overlaps with the light blocking film 241 in plan view, and is narrower than the light blocking film 241. Since the heat generated by the frame portion 231*a* is substantially uniformly generated outside the display region 5, uneven heat generation is unlikely to occur in the display region 5.

In addition, according to the first exemplary embodiment, since the FPC substrate 61 which supplies the control signal and the FPC substrates 62*a* and 62*b* which supply power by applying a voltage to the heater 230 are separated from each other, it is possible to suppress the influence of noise generated at the time of switching the constant voltage on the control signal.

The FPC substrates 62*a* and 62*b* for applying a voltage to the heater 230 do not need to be divided into two. Next, a first modification and a second modification in which the FPC substrates 62*a* and 62*b* are integrated will be described.

Figure 11:
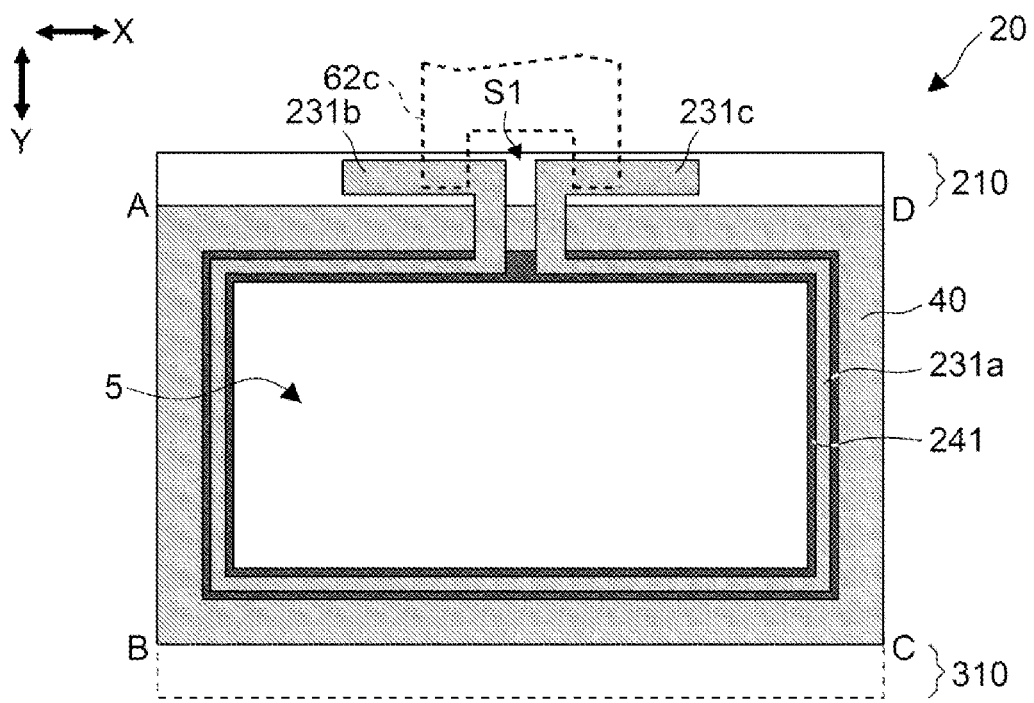
FIG. 11 is a view illustrating a first modification of the FPC substrate couplable to the counter substrate.

FIG. 11 is a view illustrating an FPC substrate 62*c* according to the first modification by a broken line. The FPC substrate 62*c* includes at least two pieces of wiring. One end of the FPC substrate 62*c* is divided into two branches, one of the two branches includes one piece of wiring, and the wiring is electrically coupled to the coupling portion 231*b*. The other of the two branches includes another piece of wiring, and the wiring is electrically coupled to the coupling portion 231*c*.

Note that, at the other end of the FPC substrate 62*c*, the two pieces of wiring are electrically coupled to the temperature control circuit 16, and the temperature control circuit 16 applies a voltage corresponding to the temperature indicated by the information Temp to the heater 230.

Figure 12:
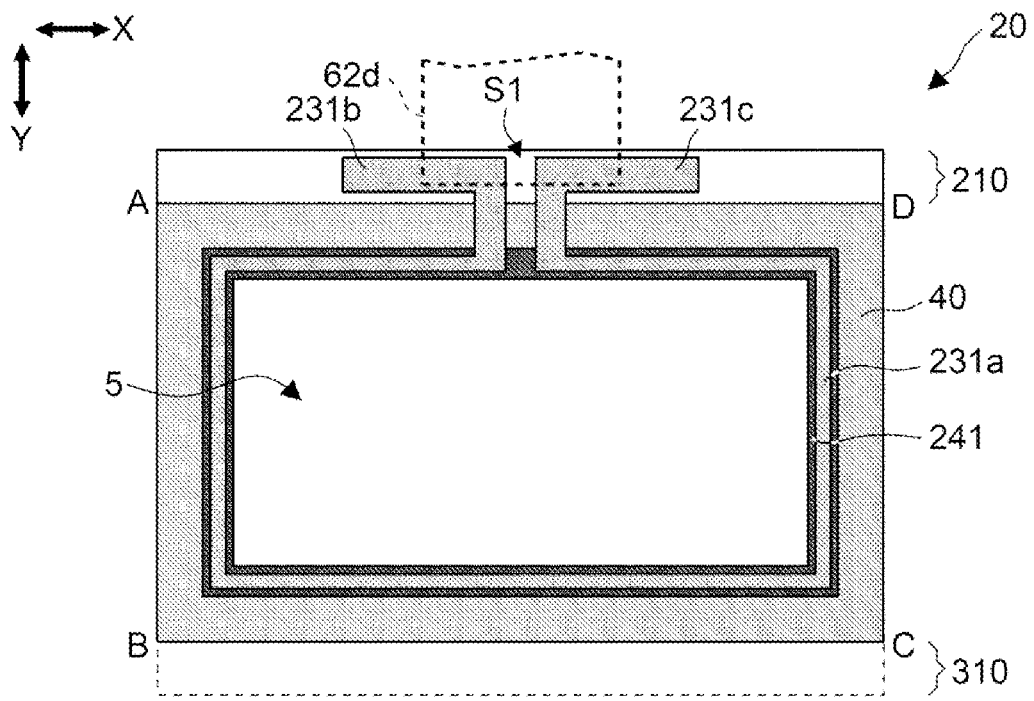
FIG. 12 is a view illustrating a second modification of the FPC substrate couplable to the counter substrate.
Figure 13:
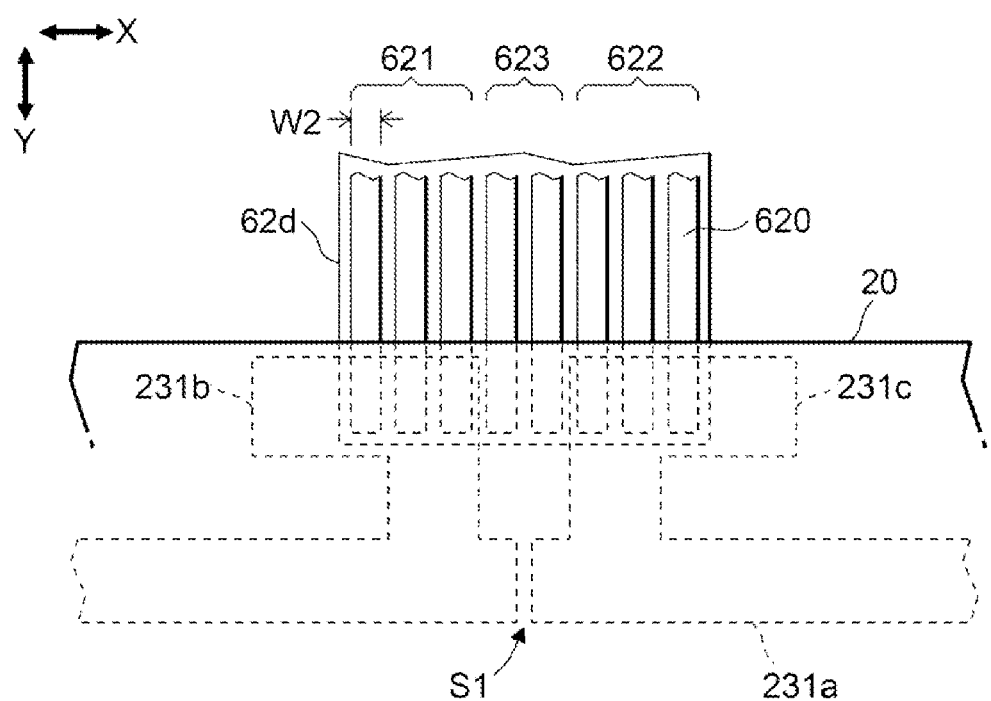
FIG. 13 is a view illustrating a coupling state between an FPC substrate and a counter substrate according to a second modification.

FIG. 12 is a view illustrating an FPC substrate 62*d* according to the second modification by a broken line, and FIG. 13 is a plan view illustrating the wiring included in the FPC substrate 62*d*. As illustrated in FIG. 13, the FPC substrate 62*d* includes, for example, eight pieces of wiring 620. The eight pieces of wiring 620 also serve as coupling terminals to the coupling portions 231*b* and 231*c* and the temperature control circuit 16, have widths W2, and are arranged at equal intervals.

The eight pieces of wiring 620 are covered with a coverlay except for the portion coupled to the coupling portions 231*b* and 231*c* and the temperature control circuit 16.

The eight pieces of wiring 620 are classified into a group 621 to which one of a positive electrode and a negative electrode of the voltage applied to the heater 230 is applied, a group 622 to which the other of the positive electrode and the negative electrode is applied, and a group 623 which is not coupled to the heater 230.

Among the eight pieces of wiring 620, the wiring belonging to the group 621 are three pieces of wiring located at the left end, the wiring belonging to the group 622 are three pieces of wiring located at the right end, and the wiring belonging to the group 623 are two pieces of wiring located between the three pieces of wiring 620 belonging to the group 621 and the three pieces of wiring 620 belonging to the group 622.

Each piece of wiring 620 of the FPC substrate 62*d* are coupled to satisfy the following relationship. That is, the three pieces of wiring 620 belonging to the group 621 are coupled to the coupling portion 231b, and the three pieces of wiring 620 belonging to the group 622 are coupled to the coupling portion 231c. Between the coupling portions 231b and 231c, the two pieces of wiring 620 belonging to the group 623 are not coupled to any of the coupling portions 231b and 231c.

Here, the number of pieces of wiring 620 of the FPC substrate 62d is set to "8" as an example, but is not limited thereto.

The line width W2 of the wiring 620 on the FPC substrate 62d is greater than the width W1 of the wiring 610 on the FPC substrate 61. The reason for this is that, since a voltage to be applied to the heater 230 is applied to the wiring 620, a large current flows as compared with the wiring 610 which supplies various control signals, etc. to the electro-optical device 10.

According to the second modification, it is possible to use, as the FPC substrate 62d, not a dedicated product but a general-purpose product in which the wiring having the same width is arranged at equal intervals. Therefore, the cost can be kept low.

In the first exemplary embodiment including the first modification and the second modification, the plurality of terminals 320 are provided at the protruding portion 210 outside the one side of the rectangular region in which the counter substrate 20 and the element substrate 30 overlap with each other in plan view, and the coupling portions 231b and 231c for applying a voltage to the heater 230 are provided at the protruding portion 310 outside a side other than the one side of the rectangular region and opposite to the one side.

The coupling portion for applying a voltage to the heater 230 is not limited thereto. Therefore, next, a second exemplary embodiment in which a coupling portion for applying a voltage to the heater 230 is provided at a side other than a side opposite to the one side of the rectangular region, specifically, on the outer side of two sides intersecting the one side of the rectangular region will be described.

Figure 14:
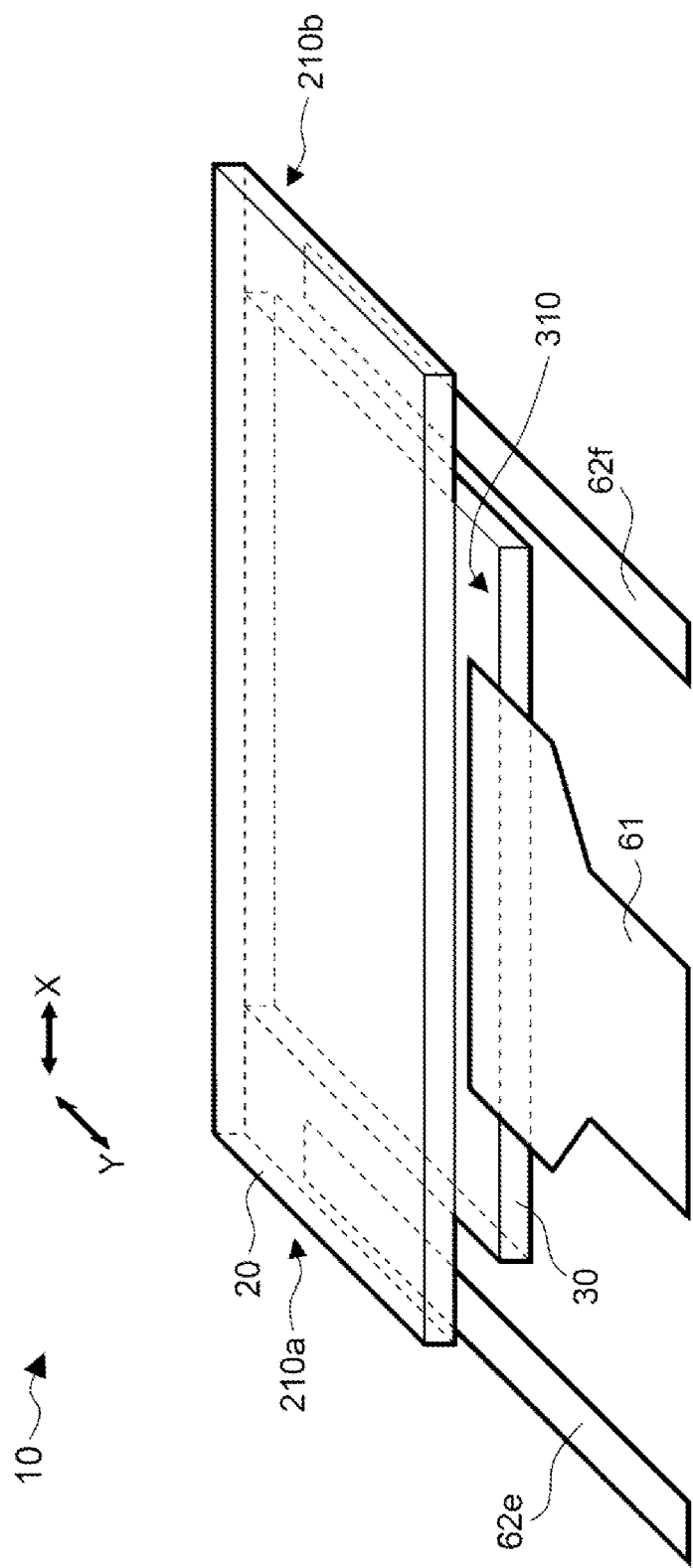
FIG. 14 is a perspective view illustrating an electro-optical device according to a second exemplary embodiment.
Figure 15:
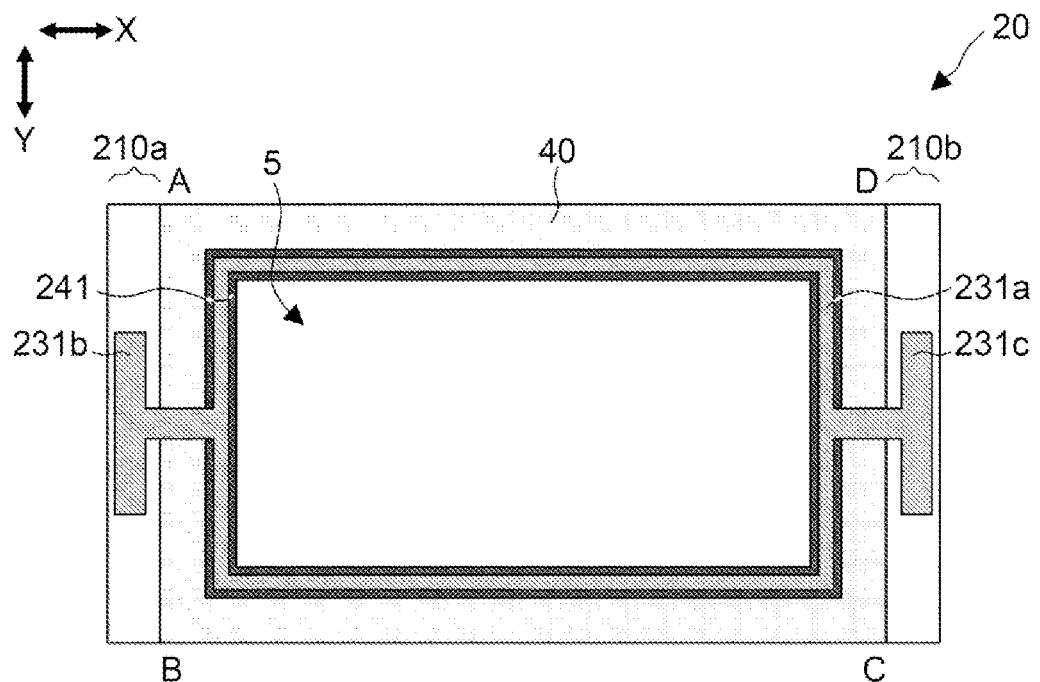
FIG. 15 is a plan view illustrating a counter substrate of the electro-optical device.

FIG. 14 is a perspective view illustrating the appearance of the electro-optical device 10 according to the second exemplary embodiment, and FIG. 15 is a plan view mainly illustrating the counter substrate 20 of the electro-optical device 10.

The second exemplary embodiment is the same as the first exemplary embodiment of FIG. 4 in that the protruding portion 310 is provided at the element substrate 30, but the length of the X-axis in the counter substrate 20 is greater than the length of the X-axis in the element substrate 30. In the second exemplary embodiment, as illustrated in FIG. 14, the counter substrate 20 and the element substrate 30 are aligned and bonded to each other on a side on the rear side, but the counter substrate 20 protrudes from the element substrate 30 to the outside of the side AB and the outside of the side CD. A portion of the counter substrate 20 which protrudes from the element substrate 30 to the outside of the side AB is referred to as a protruding portion 210a, and a portion of the counter substrate 20 which protrudes from the element substrate 30 to the outside of the side CD is referred to as a protruding portion 210b.

The protruding portion 210a is provided with the coupling portion 231b for applying a voltage to the heater 230, and the protruding portion 210b is provided with the coupling portion 231c for applying a voltage to the heater 230.

One end of the wiring provided at a FPC substrate 62e is coupled to the coupling portion 231b, and one end of the wiring provided at a FPC substrate 62 is coupled to the coupling portion 231c.

The other end of the wiring provided at the FPC substrate 62e and the other end of the wiring provided at the FPC substrate 62f are coupled to the temperature control circuit 16, and the temperature control circuit 16 applies a voltage corresponding to the temperature indicated by the information Temp to the heater 230.

In the second exemplary embodiment, similarly to the first exemplary embodiment, the sealing material 40 is provided in a frame shape on the inner side of the peripheral edge of the rectangular region in which the counter substrate 20 and the element substrate 30 overlap with each other in plan view. Similarly to the first exemplary embodiment, as illustrated in FIG. 15, the light blocking film 241 is provided in a frame shape inside the sealing material 40 and outside the display region 5.

The heater 230 has a shape illustrated in FIG. 15 in plan view. In detail, the heater 230 includes the frame portion 231a and the coupling portions 231b and 231c, but the frame portion 231a has a rectangular frame shape without the slit S1 unlike the first exemplary embodiment.

The coupling portion 231b is coupled to the frame portion 231a via the midpoint of the side AB in plan view, and the coupling portion 231c is coupled to the frame portion 231a via the midpoint of the side CD in plan view.

According to the second exemplary embodiment, similarly to the first exemplary embodiment, the frame portion 231a of the heater 230 is provided to overlap with the frame-shaped light blocking film 241 in plan view and to be narrower than the light blocking film 241. Therefore, even when the ultraviolet curable resin is used as the sealing material 40, curing of the sealing material 40 is not prevented by the light blocking film 241, and heat generation by the frame portion 231a uniformly occurs outside the display region 5, and thus it is possible to suppress uneven heat generation in the display region 5.

In addition, according to the second exemplary embodiment, since the FPC substrate 61 which supplies the control signal and the FPC substrates 62e and 62f which supply power by applying a voltage to the heater 230 are separated from each other, it is possible to suppress the influence of noise generated at the time of switching the constant voltage on the control signal.

Further, in the second exemplary embodiment, the path length of the current flowing from one of the coupling portions 231b or 231c to the other is reduced to a half as compared with the first exemplary embodiment, so that the current easily flows. Therefore, when the voltage applied to the coupling portions 231b and 231c is the same as in the first exemplary embodiment and the material of the heater 230 is the same (when the resistivity is the same), the thickness of the heater 230 in the second exemplary embodiment can be reduced to half compared to the first exemplary embodiment, and the same amount of heat generation as in the first exemplary embodiment can be obtained.

Figure 16:
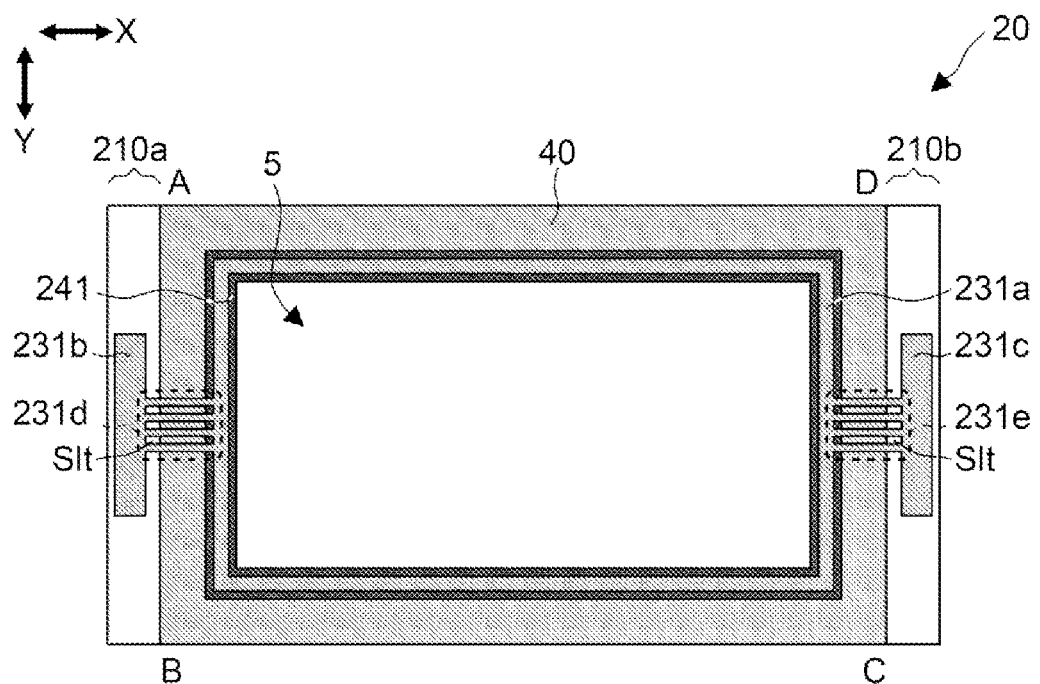
FIG. 16 is a plan view illustrating a modification of the counter substrate of the electro-optical device.

FIG. 16 is a plan view illustrating the counter substrate 20 of the electro-optical device 10 according to a modification of the second exemplary embodiment. In this modification, a plurality of opening portions Slt are provided in two portions where the heater 230 intersects the sealing material 40 in plan view.

In the case where the ultraviolet curable resin is used as the sealing material 40, when the opening portions Slt are provided a portion where the heater 230 intersects with the sealing material 40, ultraviolet rays enter the sealing material 40 through the opening portions Slt, so that the curing of the sealing material 40 can be promoted.

In the first exemplary embodiment and the second exemplary embodiment, a configuration in which the heater 230 is provided at the counter substrate 20 is adopted, but a configuration may be adopted in which the heater is provided at a substrate different from the counter substrate 20 and the element substrate 30. Therefore, a third exemplary embodiment in which the heater is provided at another substrate will be described.

Figure 17:
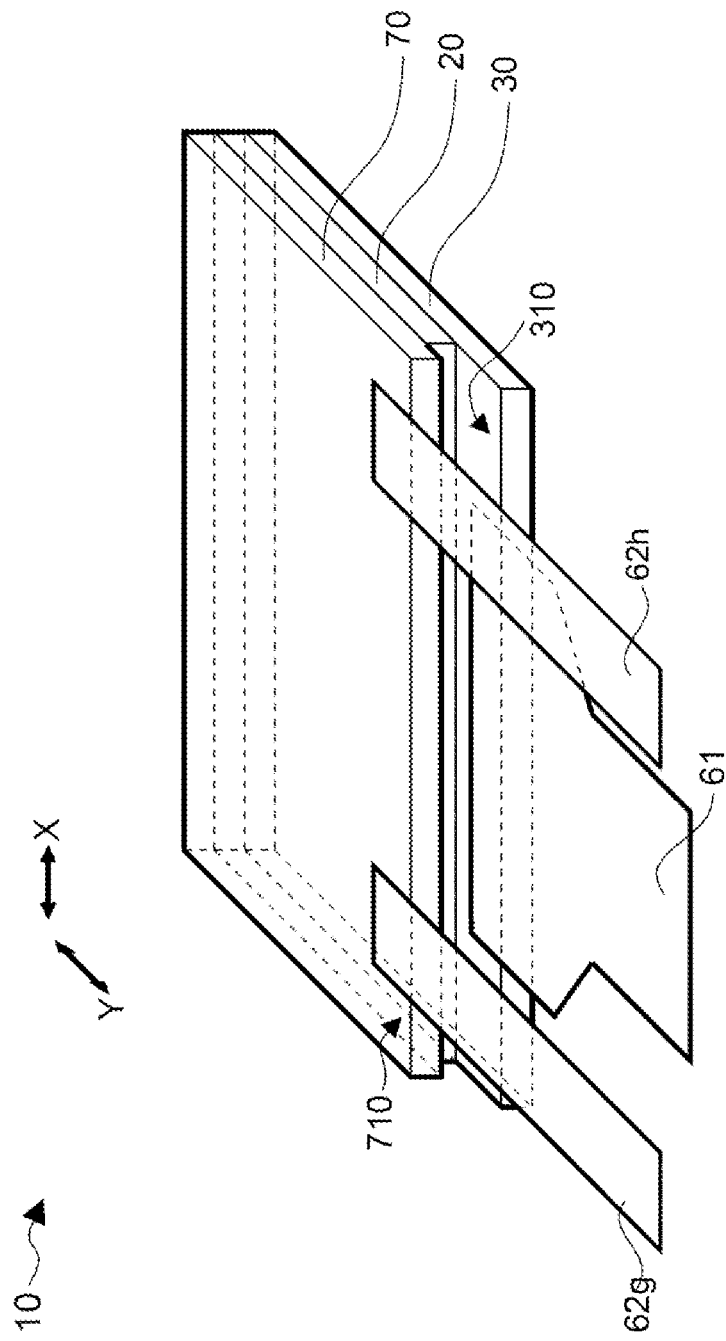
FIG. 17 is a perspective view illustrating an electro-optical device according to a third exemplary embodiment.
Figure 18:
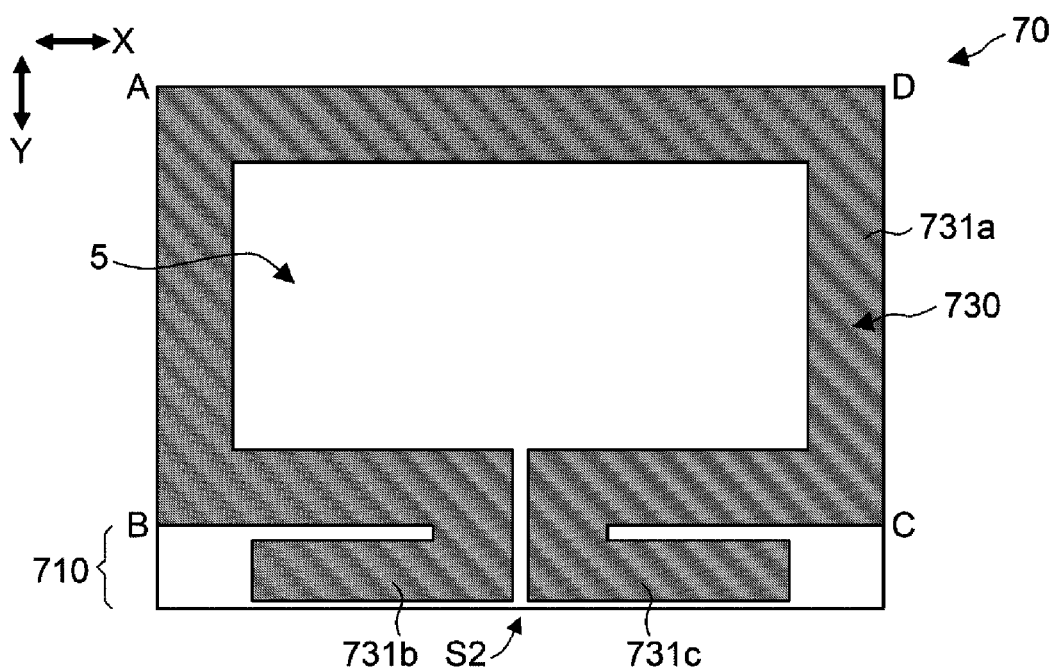
FIG. 18 is a plan view illustrating a dust-proof glass in the electro-optical device.

FIG. 17 is a perspective view illustrating the electro-optical device 10 according to the third exemplary embodiment, and FIG. 18 is a plan view illustrating the shape of the dust-proof glass 70, in particular, the heater.

As illustrated in FIG. 17, in the third exemplary embodiment, the dust-proof glass 70 is bonded to the counter substrate 20.

When dust, dirt, etc. adheres to an incident surface of the counter substrate 20, the adhering matter is enlarged and projected on the screen Scr because the incident surface 21 is close to the focal point, and thus the display quality deteriorates. In order to prevent this, the dust-proof glass 70 is bonded to the counter substrate 20. Even if the dust, dirt, etc. adheres to the dust-proof glass 70, the adhering matter is distant from the focal point by the thickness of the glass. Therefore, since the adhering matter is blurred, and enlarged and projected on the screen Scr, the deterioration of the display quality is suppressed.

In the third exemplary embodiment, the lengths of the sides along the X-axis are the same in the counter substrate 20, the element substrate 30, and the dust-proof glass 70. The length of the side of the counter substrate 20 along the Y-axis is smaller than the length of the side of the element substrate 30 along the Y-axis. The counter substrate 20, the element substrate 30, and the dust-proof glass 70 are aligned on the rear side in FIG. 4. The element substrate 30 is provided with a protruding portion 310 which protrudes from the counter substrate 20. In the third exemplary embodiment, the protruding portion 210 is not provided at the counter substrate 20.

The length of the side of the counter substrate 20 along the Y-axis is smaller than the length of the side of the dust-proof glass 70 along the Y-axis. Since the counter substrate 20 and the dust-proof glass 70 are aligned with each other on the front side in FIG. 4, the dust-proof glass 70 protrudes from the counter substrate 20. This protruding portion is referred to as a protruding portion 710.

Two terminals coupled to the heater are provided at the light incident surface of the dust-proof glass 70 and on the protruding portion 710 in plan view, that is, on the same side as the protruding portion 310. One end of the wiring in an FPC substrate 62g and one end of the wiring in an FPC substrate 62h are electrically coupled to the two terminals, respectively.

As the dust-proof glass 70, similarly to the counter substrate 20 and the element substrate 30, a base material having optical transparency and insulation properties, such as glass or quartz, is used.

In the third exemplary embodiment, as illustrated in FIG. 18, the heater 730 provided at the dust-proof glass 70 is a conductive film in which the frame portion 731a and the coupling portions 731b and 731c are integrally patterned. Note that the heater 730 preferably has a light blocking property with respect to the heater 230.

The frame portion 731a is provided along the inner side of the periphery of a rectangular region where the counter substrate 20 and the element substrate 30 overlap with each other in plan view, and is provided to be exposed in the display region 5. The frame portion 731a is provided with a slit S2 and is electrically divided into one end and the other end. The one end is extended to the protruding portion 710 to form the coupling portion 731b, and the other end is extended to the protruding portion 710 to form the coupling portion 231c. In other words, a portion of the heater 730 excluding the coupling portion 731b and the coupling portion 731c is the frame portion 731a.

In addition, according to the third exemplary embodiment, since the FPC substrate 61 which supplies the control signal and the FPC substrates 62g and 62h which supply power by applying a voltage to the heater 230 are separated from each other, it is possible to suppress the influence of noise generated at the time of switching the constant voltage on the control signal.

In addition, according to the third exemplary embodiment, the heater 730 is provided not at the counter substrate 20 on which the common electrode 22 is provided, but at the dust-proof glass 70 which is different from the counter substrate 20. Thus, the distance between the heater 730 and the common electrode 22 is increased by the thickness of the counter substrate 20, compared to a configuration in which the heater 230 is provided at the counter substrate 20. Therefore, even when the voltage applied to the heater 730 is switched, the fluctuation of the voltage is unlikely to propagate to the common electrode 22 via the parasitic capacitance, and thus it is possible to suppress an adverse effect on the display.

In the third exemplary embodiment, the dust-proof glass 70 is bonded to the counter substrate 20. However, the dust-proof glass 70 may be bonded to the element substrate 300.

SUPPLEMENTARY DESCRIPTION

For example, the following aspects of the present disclosure are understood from the embodiments illustrated above.

A liquid crystal device according to an aspect (aspect 1) includes a first substrate at which a first coupling portion is disposed, a first flexible substrate electrically coupled to the first coupling portion, a second substrate at which a second coupling portion and a heating member are disposed, the second substrate being disposed so as to overlap with the first substrate, a second flexible substrate electrically coupled to the heating member via the second coupling portion, and a liquid crystal layer disposed between the first substrate and the second substrate, wherein the first coupling portion is provided along one side of the first substrate in a region that does not overlap with the second substrate in plan view, and the second coupling portion is provided along one side of the second substrate in a region that does not overlap with the first substrate in plan view. According to this aspect, since the second flexible substrate electrically coupled to the heating member is separated from the first flexible substrate, it is possible to suppress the influence on the signal supplied to the first flexible substrate.

In the liquid crystal device according to a specific aspect 2 of the aspect 1, the second coupling portion is disposed outside a side opposite to one side of a rectangular region.

In the liquid crystal device according to a specific aspect 3 of the aspect 1, the second coupling portion is disposed outside each of two sides intersecting the one side of the rectangular region.

In the liquid crystal device according to a specific aspect 4 of the aspect 1, the second flexible substrate includes wiring configured to apply a voltage to the heating member.

The liquid crystal device according to a specific aspect 5 of the aspect 4 includes a temperature sensor, wherein a constant voltage corresponding to a detection value of the temperature sensor is applied to the wiring of the second flexible substrate. According to the aspect 5, it is possible to control heating of the electro-optical device according to the detection value of the temperature sensor.

In the liquid crystal device according to a specific aspect 6 of the aspect 1, a plurality of terminals electrically coupled to the first coupling portion are disposed at the first flexible substrate, a plurality of terminals electrically coupled to the second coupling portion are disposed at the second flexible substrate, and a width of the terminals disposed at the second flexible substrate is greater than a width of the terminals disposed at the first flexible substrate. According to the aspect 6, it is possible to make the current flowing through the terminal provided at the second flexible substrate greater than the current flowing through the terminal provided at the first flexible substrate.

In the liquid crystal device according to a specific aspect 7 of the aspect 6, the plurality of terminals disposed at the second flexible substrate include a first terminal configured to supply a first potential to the heating member, a second terminal configured to supply a second potential to the heating member, and a third terminal disposed between the first terminal and the second terminal, and electrically uncoupled to the heating member. According to the aspect 7, it is possible to use a general-purpose product in which the wiring having the same width are arranged at equal intervals as the second flexible substrate.

A liquid crystal device according to another aspect 8 includes a first substrate at which a first coupling portion is disposed, a first flexible substrate electrically coupled to the first coupling portion, a second substrate disposed so as to overlap with the first substrate, a liquid crystal layer disposed between the first substrate and the second substrate, a third substrate at which a second coupling portion and a heating member are disposed, the third substrate being bonded to one of the first substrate and the second substrate, a second flexible substrate electrically coupled to the heating member via the second coupling portion, wherein the first coupling portion is provided along one side of the first substrate in a region that does not overlap with the second substrate in plan view, and the second coupling portion is provided along one side of the first substrate in a region that does not overlap with the second substrate in plan view.

According to the aspect 8, similarly to the aspect 1, since the second flexible substrate electrically coupled to the heating member is separated from the first flexible substrate, it is possible to suppress the influence on the signal supplied to the first flexible substrate.

An electronic apparatus according to an aspect 9 includes the electro-optical device according to any one of aspects 1 to 8.

What is claimed is:

1. A liquid crystal device comprising:
    a first substrate;
    a second substrate including a first protruding portion that protrudes from the first substrate along a first direction, the first protruding portion including a first coupling portion;
    a liquid crystal layer disposed between the first substrate and the second substrate;
    a first flexible substrate electrically coupled to the first coupling portion, the first flexible substrate extending along the first direction;
    a third substrate bonded to the first substrate, the third substrate including:
        a body portion that overlaps with the first substrate and includes a heating member that is disposed outside a display region and that is not disposed in the display region, the heating member including:
            a first portion that extends along a second direction intersecting the first direction,
            a second portion that extends from the first portion along a third direction opposite the first direction and intersecting the second direction,
            a third portion that extends from the second portion along a fourth direction opposite the second direction and intersecting the third direction,
            a fourth portion that extends from the third portion along the first direction, and
            a fifth portion that extends from the fourth portion along the second direction, the fifth portion being disposed apart from the first portion; and
        a second protruding portion that protrudes from the body portion along the first direction and that protrudes from the first substrate along the first direction, the second protruding portion including:
            a first extending portion that extends from the first portion along the first direction,
            a second coupling portion that is electrically coupled to the first extending portion,
            a second extending portion that extends from the fifth portion along the first direction, and
            a third coupling portion that is electrically coupled to the second extending portion;
    a second flexible substrate electrically coupled to the heating member via the second coupling portion, the second flexible substrate extending along the first direction; and
    a third flexible substrate that is electrically coupled to the heating member via the third coupling portion, the third flexible substrate extending along the first direction.

2. The liquid crystal device according to claim 1, wherein the second flexible substrate is disposed apart from the first flexible substrate and the third flexible substrate is disposed apart from the first flexible substrate.

3. The liquid crystal device according to claim 1, wherein the second protruding portion of the third substrate overlaps with the first protruding portion of the second substrate in plan view.

4. An electronic apparatus comprising the liquid crystal device according to claim 1.

5. A liquid crystal device comprising:
    a first substrate;
    a second substrate that opposes the first substrate in an opposing direction, the second substrate including a first protruding portion that protrudes from the first substrate along a first direction that is perpendicular to the opposing direction, the first protruding portion including a first coupling portion;
    a liquid crystal layer disposed between the first substrate and the second substrate;
    a first flexible substrate electrically coupled to the first coupling portion, the first flexible substrate extending along the first direction;
    a third substrate bonded to the first substrate, the third substrate opposing the second substrate in the opposing direction with the first substrate sandwiched therebetween, the third substrate including:
- a body portion that overlaps with one of the first substrate and the second substrate, the body portion including a heating member, and
- a second protruding portion that protrudes from the body portion along the first direction, the second protruding portion protruding from the first substrate along the first direction, the second protruding portion overlapping with the first protruding portion in the opposing direction, the second protruding portion including a second coupling portion, the second coupling portion being a layer different than the first coupling portion, the second coupling portion and the first coupling portion being at different positions in the opposing direction; and a second flexible substrate electrically coupled to the heating member via the second coupling portion, the second flexible substrate extending along the first direction.

* * * * *